United States Patent [19]

Anderson

[11] Patent Number: 4,991,741
[45] Date of Patent: Feb. 12, 1991

[54] PAIL SEPARATING MECHANISM FOR AN AUTOMATIC FILLING MACHINE

[75] Inventor: Douglas R. Anderson, Eden Prairie, Minn.

[73] Assignee: Liberty Diversified Industries, New Hope, Minn.

[21] Appl. No.: 344,301

[22] Filed: Apr. 26, 1989

[51] Int. Cl.⁵ .............................................. B65G 59/06
[52] U.S. Cl. .................................... 221/223; 221/238; 414/795.6; 414/797.8; 414/797.9
[58] Field of Search ............... 221/221, 223, 236, 238, 221/297, 298; 414/795.6, 797.4, 797.8, 797.9

[56] References Cited

U.S. PATENT DOCUMENTS

| | | | |
|---|---|---|---|
| 1,344,692 | 6/1920 | Hill | 221/267 X |
| 1,416,219 | 5/1922 | Litchfield . | |
| 1,722,048 | 7/1929 | Hill | 414/795.6 X |
| 2,365,916 | 12/1944 | Terry et al. | 312/43 |
| 2,634,185 | 4/1953 | Wilder | 221/238 X |
| 2,822,953 | 2/1958 | Kunath | 414/797.9 X |
| 3,293,823 | 12/1966 | Anderson | 53/131 |
| 3,407,965 | 10/1968 | Kuhlman | 221/221 X |
| 3,584,431 | 6/1987 | Flavelle | 53/281 X |
| 3,601,282 | 8/1971 | Vogel | 221/251 |
| 3,622,040 | 11/1971 | Putnam | 221/176 |
| 3,662,919 | 5/1972 | Shmerling et al. | 221/251 |
| 3,701,440 | 10/1972 | Windstrup et al. | 221/251 X |
| 3,786,958 | 1/1974 | de Morgan | 221/67 |
| 3,841,293 | 10/1974 | Laports et al. | 221/251 X |
| 3,849,970 | 11/1974 | Kinney | 221/222 X |
| 3,858,732 | 1/1975 | Kemper | 221/251 X |
| 3,903,676 | 9/1975 | Kinney | 53/282 X |
| 3,932,978 | 1/1976 | Kinney | 221/222 X |
| 4,054,212 | 10/1977 | Mueller | 221/119 X |
| 4,082,203 | 4/1978 | Schjeldahl | 221/211 |
| 4,157,767 | 6/1979 | Schjeldahl | 221/211 |
| 4,270,669 | 6/1981 | Luke | 221/221 X |
| 4,285,187 | 8/1981 | Schjeldahl | 53/282 |
| 4,300,704 | 11/1981 | Funke et al. | 414/795.6 X |
| 4,327,843 | 5/1982 | Corley | 414/795.6 X |
| 4,809,881 | 3/1989 | Becker | 414/795.6 X |

FOREIGN PATENT DOCUMENTS 0046815  2/1987  Japan .......................... 414/797.4 X Primary Examiner—Andres Kashnikow
Assistant Examiner—K. DeRosa
Attorney, Agent, or Firm—Moore & Hansen

[57] ABSTRACT

A pail filling mechanism comprising a housing having an open top and pail supports to retain a vertical column of nested pails, and a pull-down carriage positioned within the housing and moved vertically by a power cylinder between a raised and lowered position. At the raised position, a pair of pivotally mounted toggles disposed on opposing sides of the lowermost pail engage above the rim of the lowermost pail, and the downward motion of the pull-down carriage distorts the lowermost pail slightly and strips or separates the pail from the column. The pull-down carriage moves to the lowered position, delivering the pail to a pail slide. As the pull-down carriage is again raised, a pail ejector assembly pushes the separated pail forward out of the front of the housing and into the pail infeed station of an automated filling and sealing machine.

18 Claims, 8 Drawing Sheets

4,991,741

PAIL SEPARATING MECHANISM FOR AN AUTOMATIC FILLING MACHINE

BACKGROUND OF THE INVENTION

This invention relates generally to machines for filling products into pails, tubs, and cartons, and particularly to a mechanism for separating nested plastic pails from a stack or column and sequentially delivering those pails to a filling station.

Different methods of separating the lowermost pail from a column of nested pails are known. The most frequently used methods include gripping the bottom of the lowermost pail using a selectively actuated vacuum or other suction gripping means, such as shown in U.S. Pat. Nos. 4,082,203; 4,157,767; or 4,285,187 to Schjeldahl, or alternately by a mechanical separation means such as the worm-type dispensers for rimmed containers shown in U.S. Pat. Nos. 3,849,970; 3,903,676; and 3,932,978 to Kinney, or U.S. Pat. No. 3,293,823 to Anderson.

U.S. Pat. No. 4,054,212 to Mueller discloses a cup dispensing apparatus where gripping fingers retain a horizontally oriented column of cups by gripping the rims of the nested cups while the endmost cup is positively driven toward a conveyor by pusher arms pivoting about a shaft.

U.S. Pat. Nos. 1,416,219 to Litchfield, 2,365,916 to Tarry, and 3,662,919 to Shmerling each disclose methods of bottom dispensing stacked containers utilizing a pivoting cog, finger, or lever to controllably release the lowermost pail of a column, and to retain the upper pails in the vertical column disposed above the remainder of the feed mechanism.

U.S. Pat. No. 3,584,431 to Flavelle discloses a method of separating the lowermost of a column of nested cups supported on their rims by wedges, the method using a bellows to produce a jet of air to blow the lowermost cup downwardly from the column and onto a conveyor.

Also of interest are U.S. Pat. No. 3,841,293 to Laporte which discloses an iris mechanism for dispensing items such as clay pigeons utilizing a retractable latch which pivots horizontally, and U.S. Pat. No. 3,622,040 to Putnam which discloses a mechanism for counting and dispensing a plurality of cups in a nested stack, the mechanism including two pair of horizontally movable tongue elements which engage the rims of the cups within a vertical tube.

U.S. Pat. No. 3,407,965 to Kuhlman discloses a denesting apparatus for shallow plates and pans utilizing a pair of rotating rollers with one-way clutches to frictionally contact the beveled exterior wall of the plate or pan and strip the plate or pan downwardly from the column. U.S. Pat. No. 3,858,732 to Kemper discloses a magazine for trays including a support surface slidable horizontally on a sleeve and used to raise and lower the stacked trays.

U.S. Pat. Nos. 3,601,282 to Vogel and 3,701,440 to Windstrup disclose mechanisms for denesting rimmed cartons or plates using spaced apart rods or blades which move reciprocally back and forth in parallel horizontal planes to alternately support and sequentially separate the lowermost carton or plate from the vertical stack. In the case of the Vogel '282 patent, the lowermost set of blades may also pivot to exert a prying force on the top of the rim of the lowermost plate.

While the denesting and dispensing mechanisms discussed above have a certain measure of utility in their particular applications, they have proven unsuitable for denesting deep plastic containers such as pails, particularly those fabricated from pliant plastics such as polyethylene, and those having a generally squared horizontal cross section opposed to a more circular horizontal cross section.

These types of pails become very difficult to denest due to the vacuum created between the pails if they are pressed together under weight, or when cooling after the manufacturing process. In these situations, it is not possible to generate a sufficiently strong and reliable vacuum in a gripping mechanism to grip and separate the pails without the vacuum releasing. The worm-type separators can simply strip or peel sections of the rim from the pail rather than separating the pails themselves, and are not as useful or practical when combined with a moving pail separating and conveying mechanism.

BRIEF SUMMARY OF THE INVENTION

It is therefore one object of this invention to design a pail separating mechanism to positively strip the lowermost pail from a vertical column of nested pails which are subject to strong vacuum adhesion forces.

It is a related object of this invention to design the above pail separating mechanism such that it may also perform optimally using plastic pails of the type having a generally squared-off cross section as opposed only to those having a purely circular cross section.

It is another object of this invention to design the above pail separating mechanism such that it may be mounted directly to the infeed station of an automated pail filling and sealing machine, or alternately comprise a free standing unit to operate in conjunction with such a machine.

It is an additional object of this invention to design the above pail separating mechanism such that it may be rapidly adjusted, and utilized with a wide variety of sizes and shapes of pails without replacement or modification of the mechansim's components.

It is a unique object of this invention to design the above pail separating mechanism such that the mechanism may additionally advance pails to a pail filling station by pushing a horizontal line of pails along a surface, and optionally to utilize the line of empty pails being advanced to discharge a filled pail from the fill station and replace that pail with an empty pail.

Briefly described, the pail filling mechanism of this invention comprises a housing having an open top and pail supports to retain a vertical column of nested pails, and a pull-down carriage positioned within the housing and moved vertically by a power cylinder between a raised and lowered position. At the raised position, a pair of pivotally mounted toggles disposed on opposing sides of the lowermost pail engage above the rim of the lowermost pail, and the downward motion of the pull-down carriage distorts the lowermost pail slightly and strips or separates the pail from the column. The pull-down carriage moves to the lowered position, delivering the pail to a pail slide. As the pull-down carriage is again raised, a pail ejector assembly pushes the separated pail forward out of the front of the housing and into the pail infeed station of an automated filling and sealing machine.

DESCRIPTION OF THE PREFERRED EMBODIMENT

The pail separating mechanism of this invention is shown in FIGS. 1-15 and referenced generally therein by the numeral 10.

Figure 1:
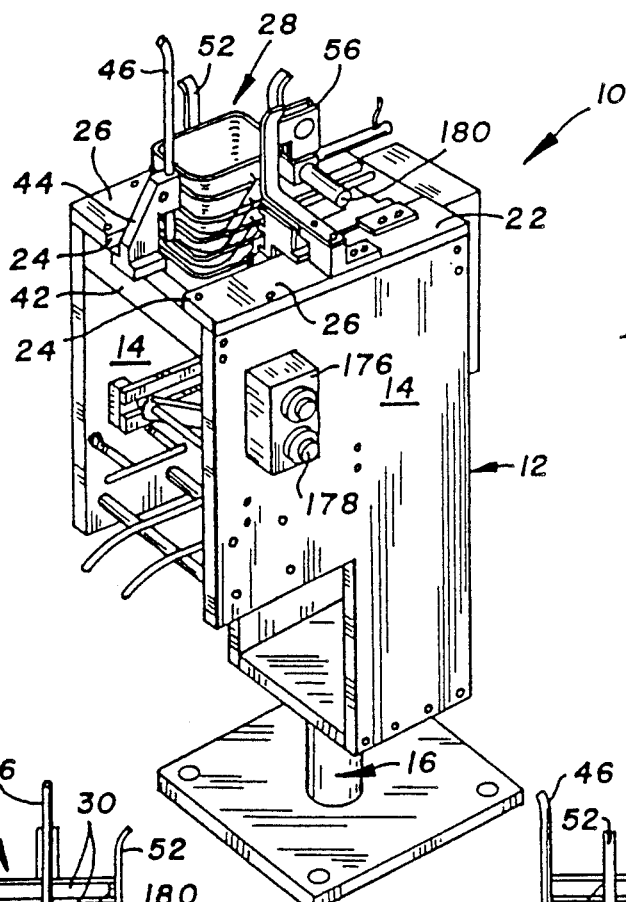
FIG. 1 is a front perspective view of the pail separating mechanism of this invention.
Figure 2:
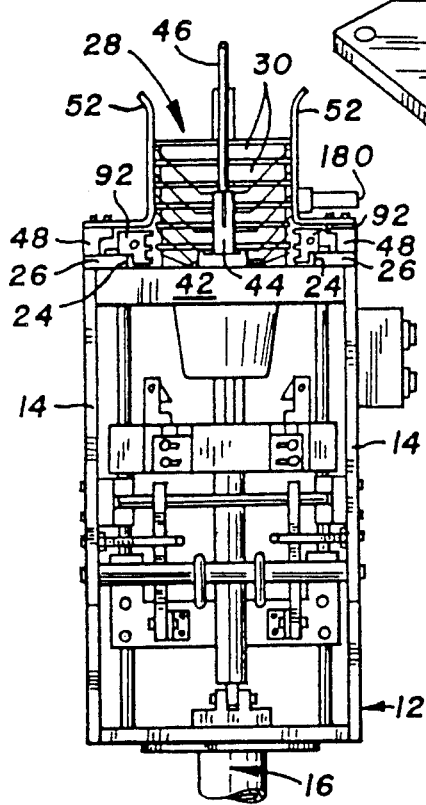
FIG. 2 is a front elevation view of the pail separating mechanism of FIG. 1.
Figure 3:
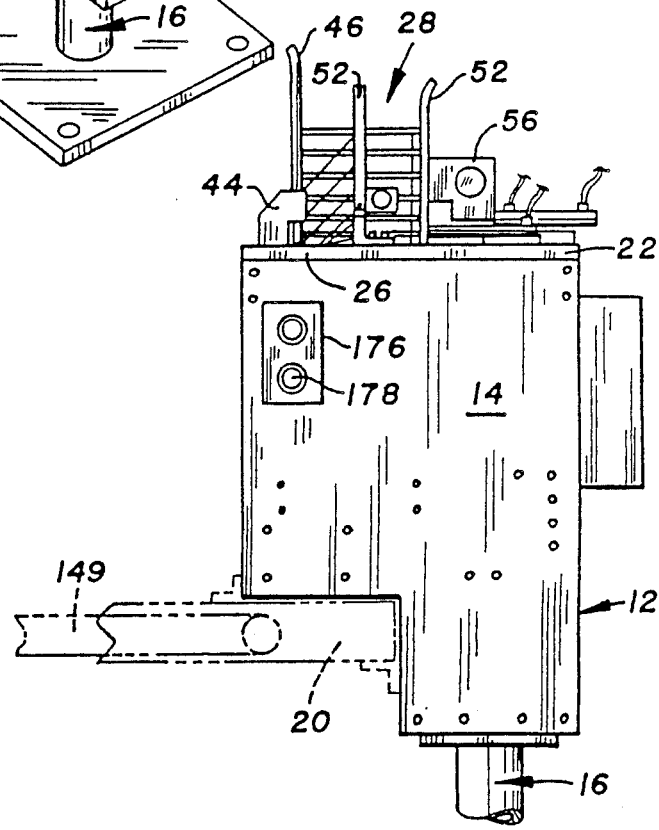
FIG. 3 is a side elevation view of the pail separating mechanism of FIG. 1.

Referring particularly to FIGS. 1-3, the pail separating mechanism 10 is mounted within a housing 12 or frame structure, the housing 12 having a pair of spaced-apart, inverted L-shaped side walls 14. The housing 12 may be supported from a pedestal or support base 16 which is mounted to the bottom wall of the housing 12, or may be attached using brackets directly to the end platform 20 or table of an automatic filling machine (not shown). The housing 12 also includes a top wall 22 defining a top opening 24 which presents a pair of forward projecting segments 26 along the top edge of each side wall 14 of the housing 12. The opening 24 is sized to receive and accommodate a vertical stack or column 28 of nested pails 30.

Figure 4:
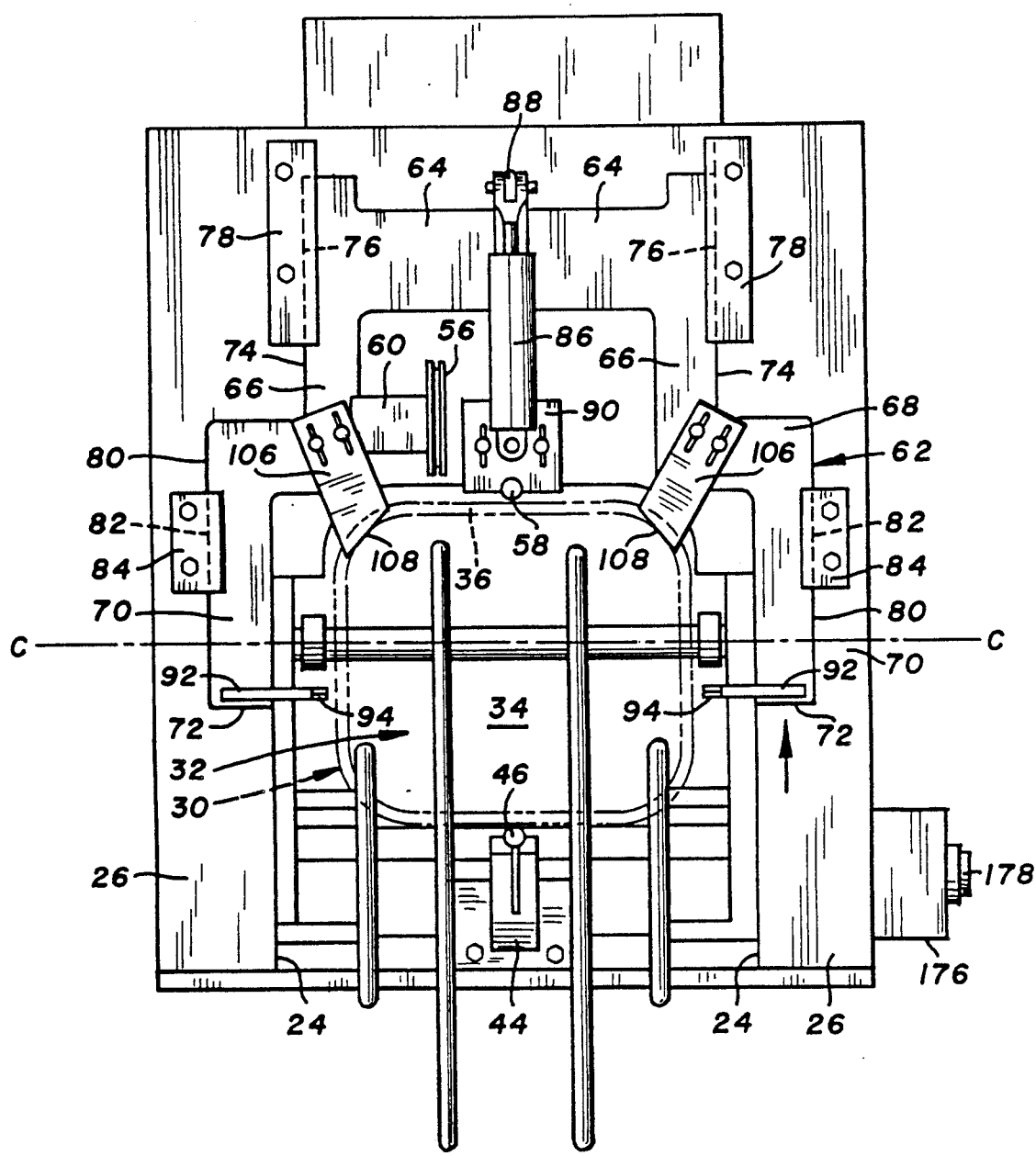
FIG. 4 is a top plan view of the pail separating mechanism of FIG. 1.
Figure 5:
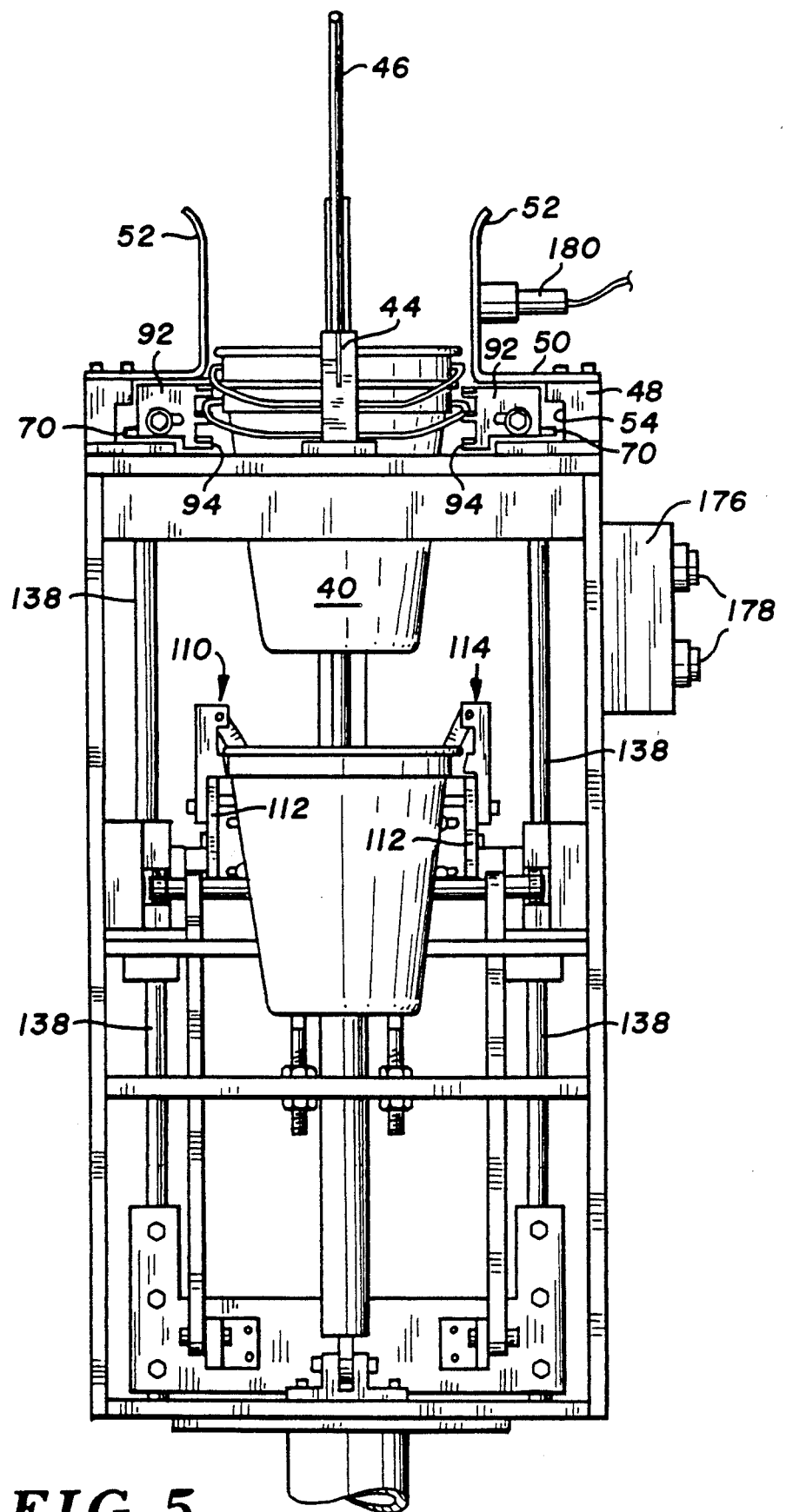
FIG. 5 is a front elevation view of the pail separating mechanism of FIGS. 1 showing the pail separating carriage in the partially retracted position.
Figure 15:
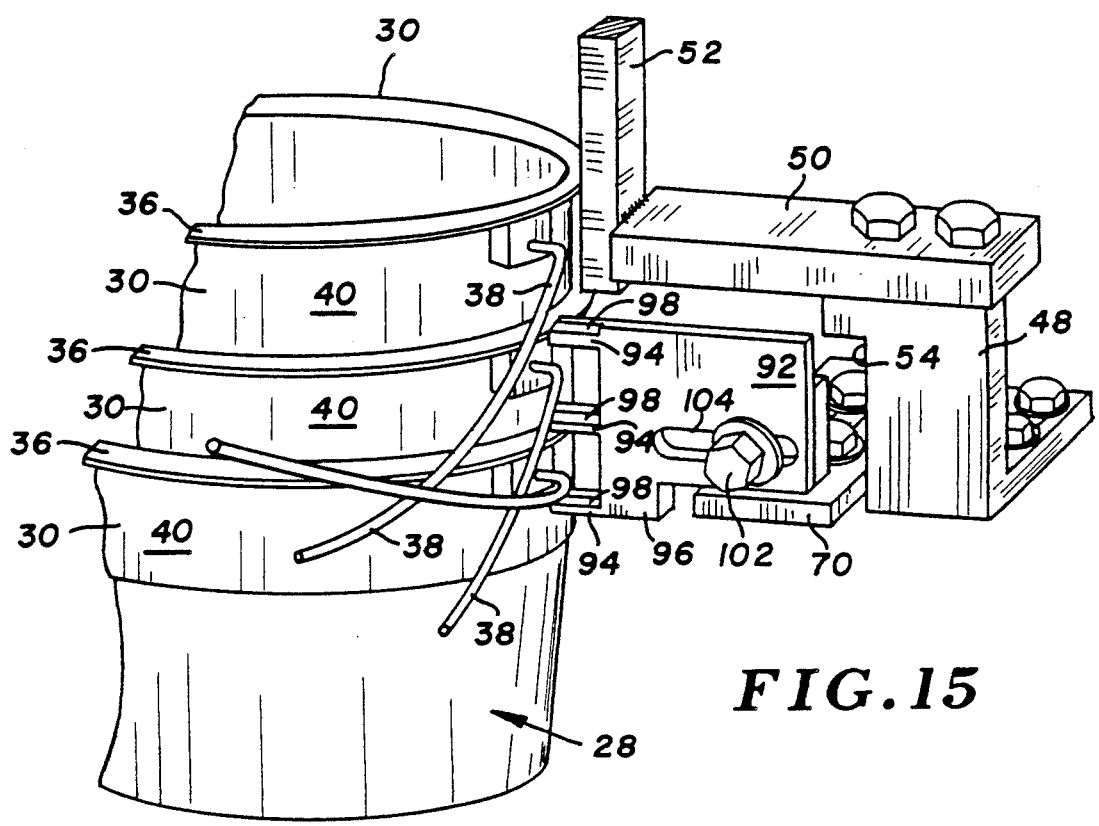
FIG. 15 is a front perspective view of the front end extension of the carriage and upright finger plate of the pail separating mechanism of FIG. 1 in the retracted position.

The pails 30 are of a generally square-bottom or rounded-square bottom configuration as shown in FIGS. 4, 5, and 15, having a generally rectangular receptacle region 32, a bottom wall 34, an outwardly projecting peripheral top rim 36 or lip surrounding the top of the receptacle region 32, and a pivotable wire handle 38 or bail bent into a U-shape and pivotably attached on opposing sides of the upright side wall 40 of the pail 30 using conventional mounting means.

Referring again to FIGS. 1-3, it may be seen that a front beam 42 extends across the opening 24 of the top wall 22 and is connected to the bottom side of the projecting segments 26 and the side walls 14 to secure and stabilize the projecting segments 26 of the top wall 22.

The pail separator mechanism 10 preferably includes stacking means for retaining the column 30 of like pails or containers 28 in a generally vertical nested stack at an elevation with the lowermost container 30 disposed proximate to the opening 24 in the top wall 22 of the housing 12. Fastened to and extending upwardly from the front beam 42 is a front pail guide mounting block 44. The mounting block 44 defines a generally vertical bore which slidably receives a front pail guide 46, the front pail guide 46 being a long section of generally rigid rod having a circular cross section, and a slight forward bend at the top end thereof, as shown particularly in FIGS. 7 and 8. The bottom end of the front pail guide 46 is received within the bore of the mounting block 44 and secured at a predetermined height using any suitable conventional means such as a threaded fastener.

Referring to FIGS. 5 and 15, fastened to and extending upwardly from the projecting segments 26 on each side of the opening 24 closely adjacent the side walls 14 are a pair of side pail guide mounting brackets 48, each mounting bracket 48 having an inwardly projecting tang member 50 to which a generally vertical, upright side pail guide 52 is fastened along the inwardly disposed end thereof. The tang members 50 are thereby displaced a distance above the plane defined by the top surface of the top wall 22 and forward projecting segments 26, and extend inwardly toward the opening 24 a distance from the inner side edges 54 of the mounting brackets 48. The side pail guides 52 may similarly be constructed of lengths of rod or bar, and are fastened to the corresponding tang member 50 and secured at a predetermined height using any suitable conventional means such as a threaded fastener. The displacement of the side pail guides 52 from the sides of a vertical column 28 of pails 30 may be modified by adjusting the position of the mounting brackets 48 relative to the opening 24 on the top wall 22 of the housing 12, just as the position of the tang members 50 on the mounting brackets 48 or the side pail guides 52 on the tang members 50 may also be adjusted using conventional threaded fasteners and adjustment slots or tracks in the tang members 50 or mounting brackets 48.

Figure 7:
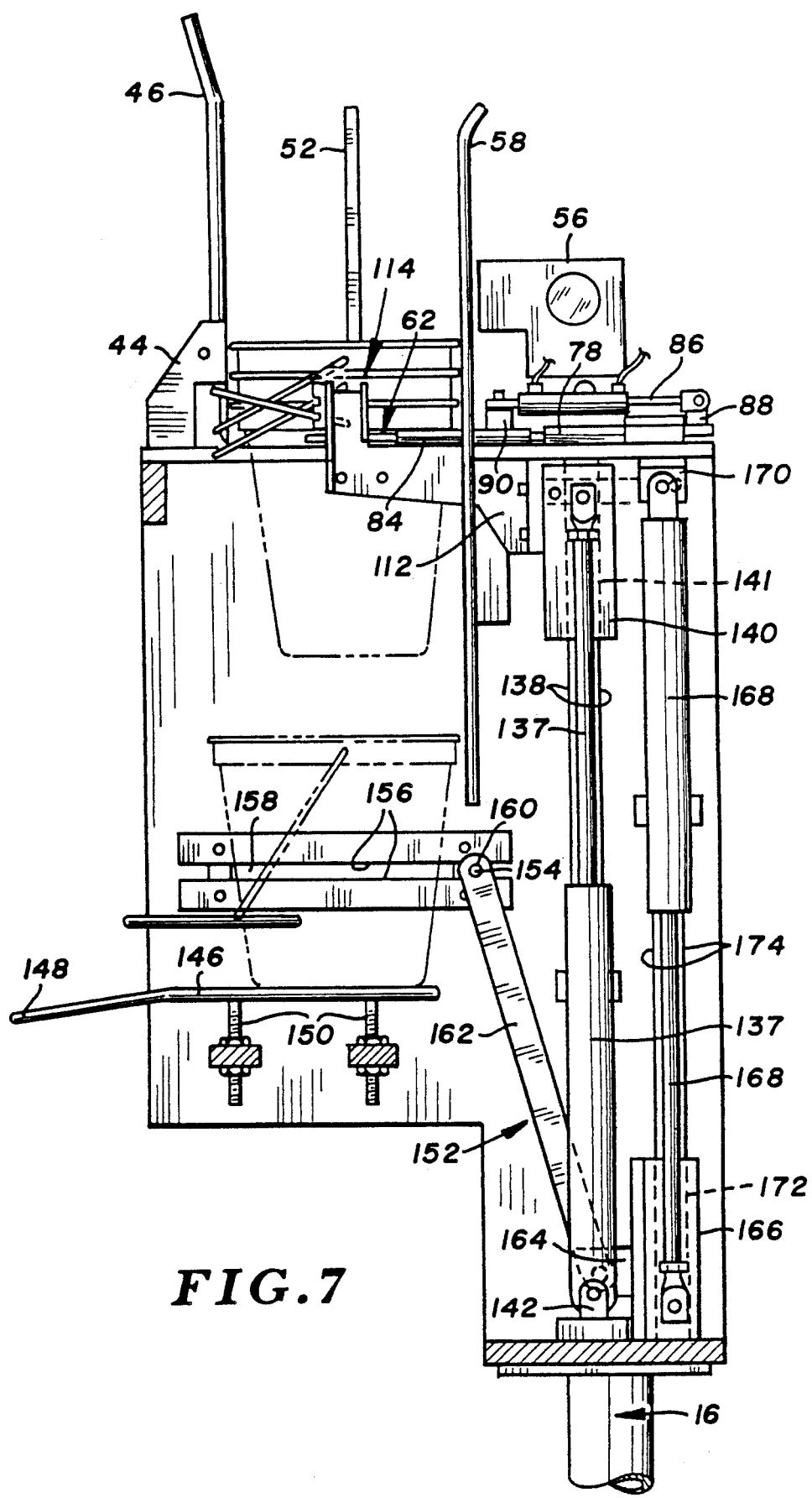
FIG. 7 is a side cross section view of the pail separating mechanism of FIG. 1 taken through line 7—7 of FIG. 6.

The front pail guide 46 extends downwardly to a point at or slightly above the plane defined by the top surface of the top wall 22, the tip being beveled or tapered upwardly along the outer side thereof. A portion of the front pail guide mounting bracket 44 on which the front pail guide 46 is mounted extends rearwardly toward the opening 24, such that an open area is disposed beneath that portion of the mounting bracket 44, and between the front pail guide 46 and upright portion of the mounting bracket 44, as shown in FIGS. 1 and 7. The side pail guides 52 preferably do not extend significantly below the bottom surface of the tang member 50.

Figure 6:
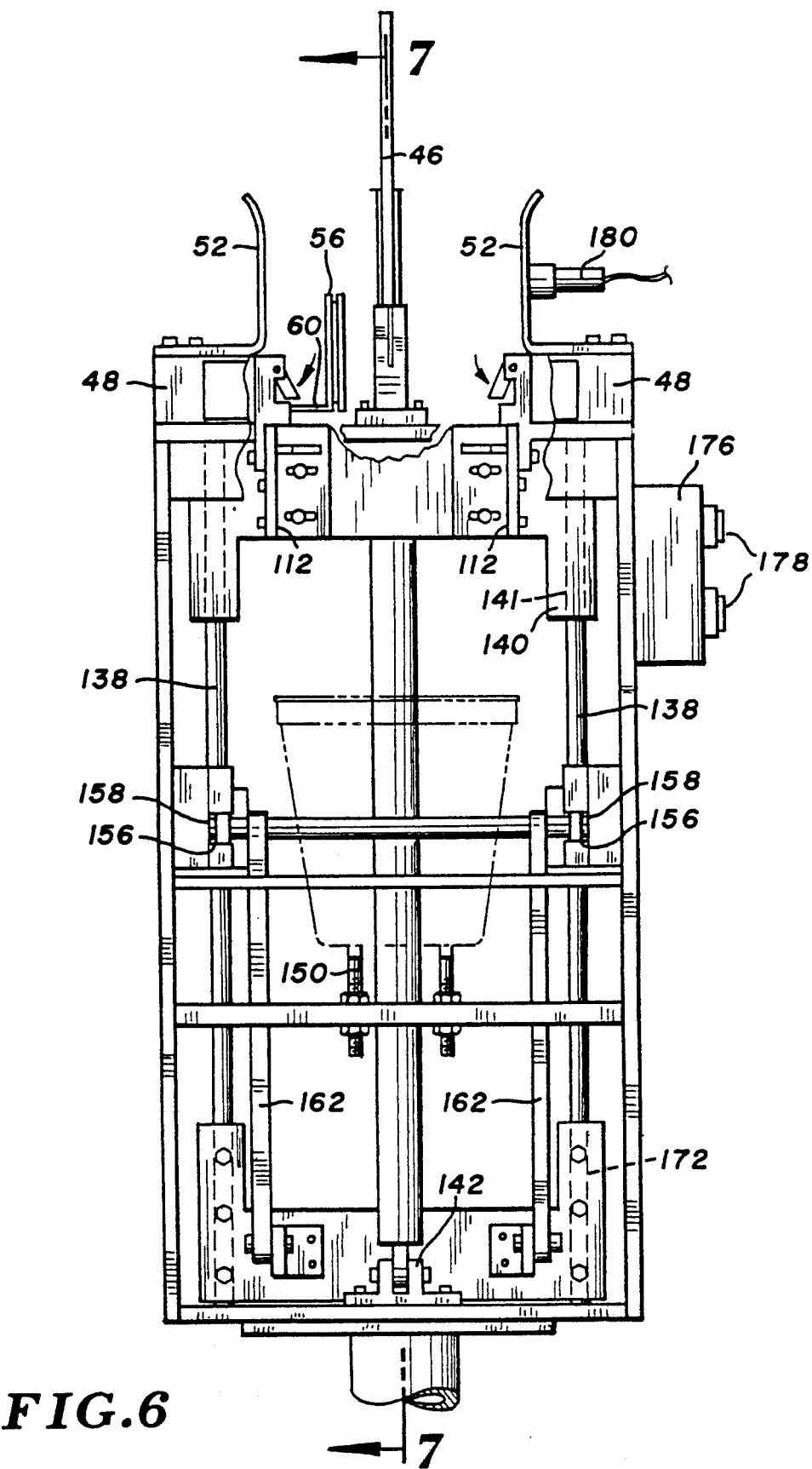
FIG. 6 is a front elevation view of the pail separating mechanism of FIG. 1 showing the pail separating carriage in the extended position.

Again referring to FIGS. 1, 6, and 7, fastened to and extending upwardly from the top wall 22 of the housing 12 directly behind or rearwardly of the opening 24 is a date coder mounting bracket 56. The mounting bracket 56 has a generally upright segment to which a conventional date coder (not shown) is fastened, the lower portion 60 of the mounting bracket 56 extending laterally generally perpendicular to the upright segment and being displaced to one side of the longitudinal centerline of the opening 24 and attached to the top wall 22 of the housing 12 at a position laterally remote from the position of the upright segment of the mounting bracket 56. A rear pail guide 58 extends upwardly and downwardly from, and is fixedly attached to, the top wall 22 of the housing 12 adjacent to the rear edge of the opening 24. The upright segment of the mounting bracket 56 is displaced a distance above the plane defined by the top surface of the top wall 22 as shown in FIG. 7 and slightly offset to one side from the rear pail guide 58 as shown in FIG. 6.

Figure 8:
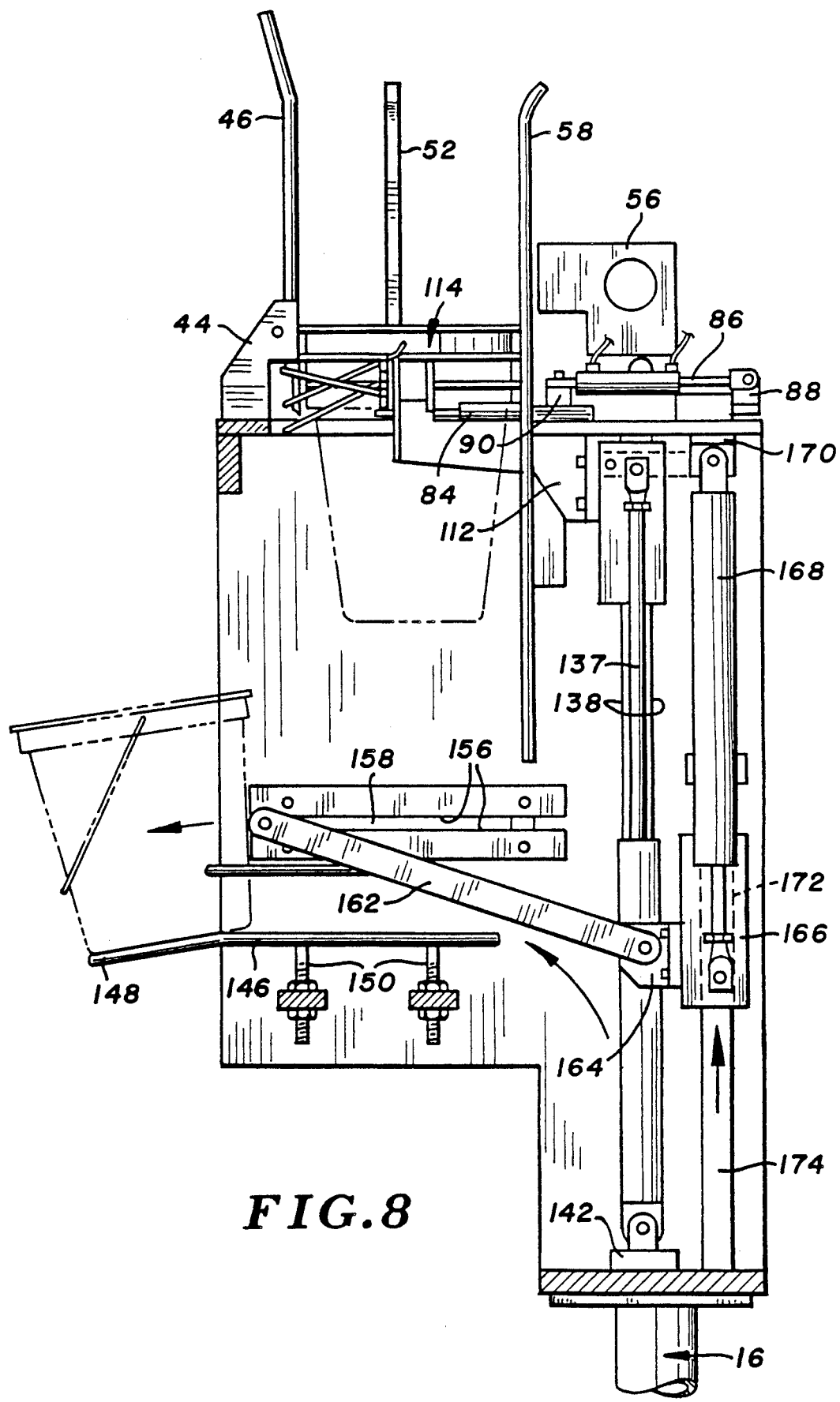
FIG. 8 is a side cross section view of the pail separating mechanism of FIG. 1 also taken through line 7—7 of FIG. 6.
Figure 9:
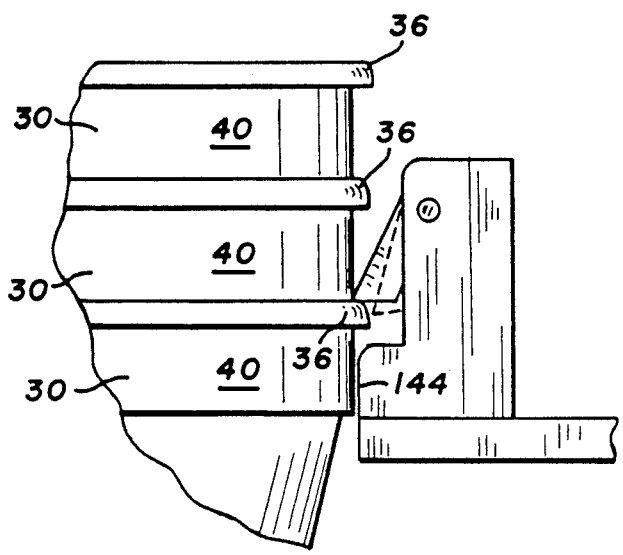
FIG. 9 is a side elevation view of the pail gripping toggle assembly of the pail separating mechanism of FIG. 1.
Figure 10:
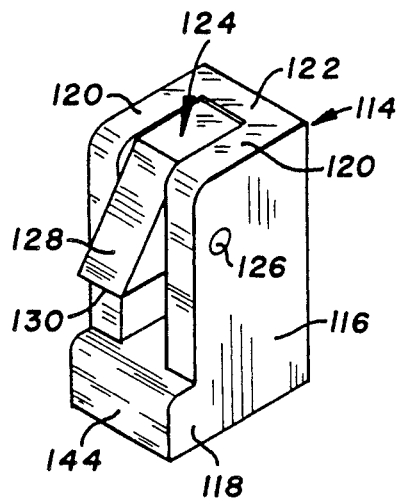
FIG. 10 is a perspective view of the pail gripping toggle assembly of the pail separating mechanism of FIG. 1.
Figure 11:
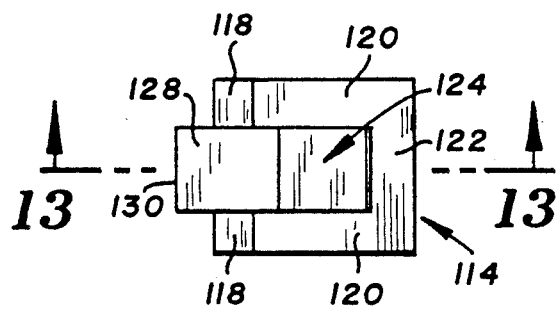
FIG. 11 is a top plan view of the pail gripping toggle assembly of the pail separating mechanism of FIG. 1.
Figure 12:
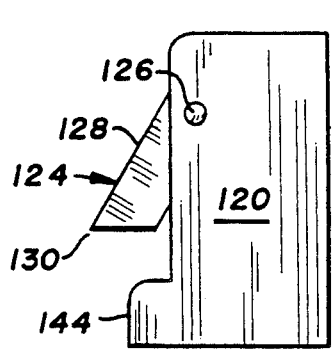
FIG. 12 is a side elevation view of the pail gripping toggle assembly of the pail separating mechanism of FIG. 1.

Referring to FIGS. 4, 7, and 8, it may be seen that mounted on and carried slightly above the top surface of the top wall 22 is a sliding pail support carriage 62 constructed from a generally flat plate having a rear cross piece 64, two forward extensions 66 each extending forwardly from one of the ends of the rear cross piece 64 generally perpendicular thereto and forming a rounded corner therewith, two intermediate side extensions 68 each extending outwardly toward the side walls 14 from the front ends of the forward extensions 66 generally perpendicular thereto and forming a rounded corner, and two front end extensions 70 each extending forwardly from one of the ends of the intermediate side extensions 68 generally perpendicular thereto and similarly forming a rounded corner. The front ends 72 of the front end extensions 70 project forwardly to a point slightly forward of the lateral centerline of the opening 24 and pails 30, as shown in FIG. 4.

The support carriage 62 is mounted for horizontal sliding movement in a plane parallel to and slightly above the plane defined by the top surface of the top wall 22. The outer side edge 74 of the support carriage 62 along each forward extension 66 and the opposing ends of the rear cross piece 64 are received within a groove 76 or track cut in the inner side surface of a rear carriage guide 78, and the outer side edge 80 along each front end extension 70 is received within a similar groove 82 or track in the inner side surface of a front carriage guide 84. The rear carriage guides 78 and the front carriage guides 84 are each mounted on the top wall 22 of the housing 12 using threaded fasteners or similar means, and their position, location, or orientation may be adjusted to accommodate carriages 62 of different sizes and shapes depending upon the type of pail 30 being utilized.

The support carriage 62 is moved forward and backward relative to the opening 24 within the rear carriage guides 78 and front carriage guides 84 by a double acting power cylinder 86, the power cylinder 86 being attached to an upwardly extending rear cylinder mounting bracket 88 centered along the rear cross piece 64 of the support carriage 62, and to an upwardly extending front cylinder mounting bracket 90 attached to the top wall 22 of the housing 12 and centered just behind the opening 24.

Figure 14:
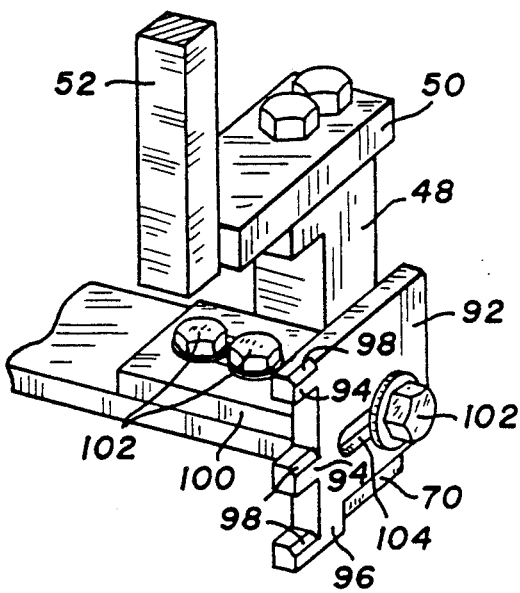
FIG. 14 is a side perspective view of the front end extension of the carriage and upright finger plate of the pail separating mechanism of FIG. 1.

Referring to FIGS. 4, 5, 14, and 15, extending upwardly from the front end 72 of each of the two front end extensions 70 of the support carriage 62 is an upright finger plate 92, similar in construction and operation to those disclosed in U.S. Pat. No. 4,082,203. The upright finger plates 92 are oriented generally perpendicular to the lateral centerline of the opening 24 and pails 30, and each moves with the carriage and passes under the mounting brackets 48 supporting the side pail guides 52. Referring to FIGS. 14 and 15, each upright finger plate 92 defines a plurality of inwardly extending finger elements 94, preferably three, the lowermost finger element 94 extending from a depending leg 96 of the upright finger plate 92 which depends below the front end extension 70 of the support carriage 62. The upper front corner 98 of each finger element 94 is beveled or angled downwardly at approximately a 45° angle over the entire length and approximately half the thickness thereof. The finger elements 94 are spaced apart to receive the bails 38 of the bottom two pails 30 of the column 28 therebetween as the support carriage 62 and upright finger plates 92 move forwardly to an extended position, the finger elements 94 lifting the bails 38 of the bottom three pails 30 such that the bail 38 of the bottom pail 30 will not hook or catch upon the bails 38 of the remaining two pails 30 as the bottom pail 30 is separated from the column 28.

The upright finger plates 92 are each mounted to a finger plate mounting block 100 using a threaded fastener 102 which extends through a slot 104 in the vertical face of the upright finger plate 92, the finger plate mounting blocks 100 each being fastened to the support carriage 62 using a similar threaded fastener 102, such that the location, height, and displacement of the finger elements may be adjusted.

Referring to FIG. 4, it may be seen that a pair of rear corner pail supports 106 are slidably mounted on and project inwardly from the corners between the forward extensions 66 and intermediate side extensions 68 of the support carriage 62, and are secured thereto using threaded or adjustable fasteners. The rear corner pail supports 106 project partially into and obstruct the rear portion of the opening 24 at an angle thereto, and each rear corner pail support 106 has an angled front face 108 disposed tangential to the corners of the pails 30 in the column 28, which may be selectively adjusted so as to be disposed at varying angles and distances from the side wall 40 of the lowermost pail 30 in the column of pails 28.

The sliding pail support carriage 62, including the upright finger plates 92 and associated assembly, as well as the rear corner pail supports 106, form column support means designed to engage the column 28 of pails 30 and controllably lower the elevation of the column 28 of pails 30 an increment generally equal to the normal vertical spacing between the top rims 36 of adjacent pails 30 when those pails 30 are nested. The manner of operation of these column support means, including the manner of separating the bails 38 so as to prevent interlocked pails 30 is discussed in detail in U.S. Pat. No. 4,082,203, incorporated herein by reference.

Referring to FIGS. 5-8, mounted beneath the top wall 22 of the housing 12 and extending upwardly through the opening 24 on either side of the column 28 of pails 30, and disposed adjacent to the inner side surfaces of the front end extensions 70 of the support carriage 62 and the rear surface of the upright finger plates 92 is a pail pull-down carriage assembly 110. The pail pull-down carriage assembly 110 includes a pair of pull-down brackets 112 each disposed on opposing sides of the opening 24 and extending generally parallel to the sides thereof, and pail separating means for separating the lowermost pail 30 from the column 28 including a pail gripping toggle assembly 114 attached to and extending upwardly from the forward end of each of the pull-down brackets 112 and disposed closely adjacent to the side wall 40 of the pails 30 in the column 28.

Figure 13:
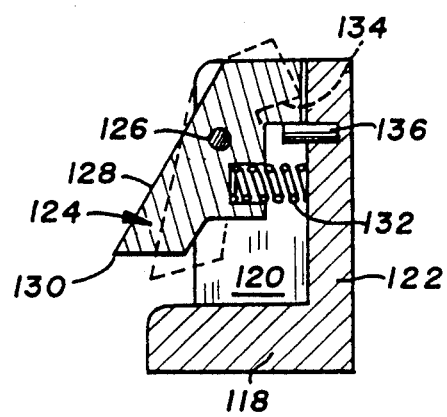
FIG. 13 is a cross section view of the pail gripping toggle assembly of the pail separating mechanism of FIG. 1 taken through line 13—13 of FIG. 11.

Referring to FIGS. 9-13, one embodiment of the pail gripping toggle assembly 114 is shown including a toggle mounting block 116 having a base portion 118, a pair of spaced apart upright side walls 120, and a back wall 122 extending between the upright side walls 120 along the outer edges thereof. Disposed between the side walls 120 is a toggle 124 or pall mounted to move pivotally about an axis defined by a toggle axle 126 which is received within apertures in the side wall 120. Each toggle 124 has an acutely angled top surface 128 facing and closely confronting the top rim 36 of the lowermost pail 30 when the toggle 124 is disposed beneath the top rim 36 of the lowermost pail 30, the top surface 128 extending downwardly to a tip portion 130 which closely confront or contacts the side wall 40 of the lowermost or second to lowermost pail 30. The tip portion 130 of the toggle 124 may be moved outwardly and upwardly relative to the back wall 122 of the toggle mounting block 116 by pressure, and the angled face 128 similarly moved upwardly by a spring 132 disposed between the back wall 122 and the toggle 124. The toggle 124 may be pivoted until the lower or rear edge 134 of the toggle 124 contacts the back wall 122 or a stop pin 136 received within and projecting from the back wall 122 as shown in FIG. 13.

Referring to FIG. 5-8, it may be seen that the pail pull-down carriage assembly 110 is mounted for vertical movement between a raised or extended pail gripping position as shown in FIG. 6 and a lowered or retracted pail delivery position as shown in FIG. 5. The pail pull-down carriage assembly 110 is carried along a generally linear vertical path by a double acting power cylinder 137, the pull-down carriage assembly 110 traveling on a first pair of guide bars 138 spaced apart on each side of the column of pails 28 proximate to the side walls 14 of the housing 12. The power cylinder 137 is mounted at the top end thereof to a first cross bracket 140 extending between the pull-down brackets 112, the cross bracket 140 being attached to the pull-down carriage assembly 110 and defining a pair of generally vertical spaced apart bores 141 which slidably receive the guide bars 138. The lower end of the power cylinder is fastened to a cylinder mounting bracket 142 which is fixedly attached to the housing 12.

Referring particularly to FIG. 7, it may be seen that the pull-down carriage assembly 110 is lifted by the power cylinder 137 to the raised position, the toggles 124 being pivoted outwardly away from the side wall 40 of the lowermost pail 30 as the angled face 128 of each toggle 124 contacts the peripheral top rim 36 of the lowermost pail 30, the springs 132 causing the toggles 124 to pivot back inwardly after the toggle 124 moves upwardly past and clears the top rim 36 so that the top portion 130 of each toggle 124 securely engages above the top rim 36 of the lowermost pail 30.

When contracted, the power cylinder 137 exerts a downward pulling force on the bracket 140 and pull-down carriage assembly 110, causing the pull-down carriage assembly 110 to move rapidly downwardly with the toggles 124 engaged above the top rim 36 of the lowermost pail 30, thereby stripping the lowermost pail 30 from the stack of pails 28 which remains supported by the finger elements 94 of the upright finger plates 92 and the rear corner pail supports 106.

The lowermost pail 30 is then controllably lowered by the pull-down carriage assembly 110, the pull-down carriage assembly 110 and bracket 140 moving in a generally vertical linear path defined by the guide bars 138, with the pail 30 being supported by the base portions 118 of the pail gripping toggle assemblies 114, the front edges 144 of which are proximate to and closely confronting the side wall 40 of the pail 30. The pail 30 is lowered until the bottom wall 34 rests upon the tops of a pair of pail slides 146 which define a generally horizontal plane, the front ends 148 of which extend outwardly from the open front of the housing 12 and angle slightly downward.

The plane of the top of the pail slides 146 and open front end of the housing 12 thereby define a pail delivery station communicating with the end platform 20 or conveyor 149 of the automatic pail filling and sealing machine. The pail delivery station may optionally comprise any generally horizontal plane or surface on which the separated pail 30 will rest and can be pushed or slid longitudinally with a minimum of friction. The front ends 148 of the pail slides 146 may be positioned slightly above or co-planar with the end platform 20 or conveyor 149 which feeds the pails 30 from the pail separating mechanism 10 to the filling station, the height of the pail slides 146 being adjusted relative to the housing 12 by means of the pail slide mounts 150 to which the pail slides 146 are attached using any conventional adjustment means such as a threaded bearing mount or the like.

In some applications, it may be preferred that a pail ejector assembly 152 be utilized to advance pails 30 to the pail filling station by pushing a horizontal line of pails 30 along the surface of the end table 20, or optionally to utilize the line of empty pails 30 being advanced to discharge a filled pail 30 from the fill station and replace that filled pail 30 with an empty pail 30.

The pail ejector assembly 152 ejects the separated pail 30 resting on the pail slides 146 from the pail separating mechanism 10 as shown in FIGS. 1, 7, and 8. The pail ejector assembly 152 comprises a horizontal pail ejector bar 154 which extends laterally across the housing 12 behind the separated pail 30 at about mid-height thereof when the pail ejector assembly is in the retracted position as shown in FIG. 7, the pail ejector bar 154 having a length oriented generally perpendicular to the linear path of the pail 30 as it is slidably ejected from the front of the housing 12. The pail ejector bar 154 is mounted to slide within a guide groove or track 158 defined by the facing surfaces of two ejector bar guides 156 disposed on opposing sides of the housing 12. The pail ejector bar 154 must move reciprocally both forward into contact with the separated pail 30 resting on the plane plus a distance sufficient to eject the separated pail 30 from the open front of the housing 12, and backward or rearwardly to a position disposed behind the position at which the separated pail 30 rests in the pail delivery station. The surfaces defining the track 156 must be kept in close parallel alignment to prevent the pail ejector bar 154 from freezing or jamming within the track 156, and the ejector bar guides 158 must therefore be securely fastened to the housing 12 to maintain their positions, and may be mounted for adjustment of spacing tolerances as appropriate.

The pail ejector bar 154 is attached to a pail ejector bar carrier means whereby the ends of the pail ejector bar 154 are each received with an aperture 160 defined in the top end of one of a pair of cantilevered push-out bars 162, the opposing or bottom ends of which are attached to one of a pair of forwardly extending mounting flanges 164 disposed at one of the opposing ends of a cross bracket 166 fastened conventionally to the lower end of a double acting power cylinder 168. The power cylinder 168 is mounted to the housing 12 in a generally vertical orientation, the top end of the power cylinder 168 being fixedly connected adjacent to the top of the housing 12 using a bracket 170.

As the double acting power cylinder 168 contracts and simultaneously raises the cross bracket 166 and lower ends of the push-out bars 162, the top or opposing ends of the push-out bars 162 are pushed forward. The motion of the push-out bars is constrained by the pail ejector bar 154, which must travel along a generally linear forward path defined by the tracks 156, thereby carrying the ends of pail ejector bar 154 within the tracks 156 of the ejector bar guide 158 forwardly to eject the pail 30 from the pail separator mechanism 10. Once the pail 30 is ejected and the power cylinder 168 fully retracted such that the pail ejector bar 154 and top or forward ends of the push-out bars 162 are at their farthest forward displacement as shown in FIG. 8, the power cylinder 168 may then extend to lower the bottom or rearward ends of the push-out bars 162, thereby pulling the forward or top ends of the push-out bars 162 and the pail ejector bar 154 rearwardly along the track 156 to the initial position as shown in FIG. 7. The cross bracket 166 preferably defines a pair of spaced apart vertical bores on opposing sides of the cross bracket 166 which receive vertical guide bars 174, the ends of the vertical guide bars 174 being fastened or mounted to the top and bottom sections of the housing 12.

In operation, the pail separating mechanism 10 is installed proximate to the infeed station of an automatic pail filling and sealing machine, with the front of the pail separating mechanism 10 facing toward and parallel with the direction that the pails 30 are fed into the filling station. The pail separating mechanism 10 is supplied with electrical and pneumatic power to operate the control systems and the power cylinders 86, 137, 168.

An operator will place a plurality of pails 30 nested in a column 28 into position disposed between the front, side, and rear pail guides 46, 52, 58 and supported in a raised or elevated position with the top rim 36 of the lowermost pail 30 approximately adjacent to the top 22 of the housing 12, and will engage the top rim 36 of the lowermost pail 30 on the rear corner pail supports 106, the finger elements 94 of the upright finger plates 92, and in some instances the front edges 144 of the base portion 118 of the toggle mounting blocks 116 if the pail pull-down carriage assembly 110 is in the raised position.

The operator then activates the pail separating mechanism 10 utilizing a control panel 176 having start and stop buttons 178 to control the supply of electrical power or pneumatic pressure to the system.

The pail pull-down carriage assembly 110 is raised by the power cylinder 137 until the angled top surfaces 128 of the toggles 124 contact the lower side of the top rim 36 of the lowermost pail 30 in the column 28, the top rim 36 depressing the toggles 124 outwardly and into the toggle mounting blocks 116 to provide clearance so that the top portion 130 of the toggle 124 will clear the outer edge of the top rim 36 as the pull-down carriage assembly 110 is raised. Once the tip portion 130 of the toggle 124 is raised above the top rim 36 of the lowermost pail 30, the springs 132 will push the toggles inwardly and the tip portions 130 of the toggles 124 will securely engage above the top rim 36 of the lowermost pail 30. Sensors 180 such as photoelectric beams or limit switches sense the position of the pull-down carriage assembly 110 at this raised position with the toggles 124 engaged on the top rim 36 of the lowermost pail. The sensors 180 provide a signal to a logic control circuit indicating that the pull-down carriage assembly 110 is in the raised position, thereby causing the logic control circuit to deactivate the extension of the power cylinder 137 and begin contraction thereof.

As the power cylinder 137 contracts, the pull-down carriage assembly 110 begins to move downward along a generally linear vertical path toward the pail delivery station and pail slides 146 beneath. As the pull-down carriage assembly 110 moves downward, the tip portion 130 and lower surface of the toggles 124 exert a downward and slight inward pressure on the top rim 36 and side wall 40 of the lowermost pail 30. In a situation where an extremely tight seal or airlock and a strong vacuum has been created between the lowermost pail 30 and the pail 30 disposed above the adjacent to the lowermost pail 30, this downward pressure will cause the top rim 36 and side wall 40 of the lowermost pail 30 to distort and buckle slightly, and the top portion 130 of the toggle 124 will press inwardly on the opposing side walls 40 of the second to lowermost pail 30 and create an air space between the side walls 40 of the lowermost pail 30 and the second to lowermost pail 30, thereby releasing the seal or airlock and permitting the pressure differential to be equalized as the lowermost pail 30 is stripped from the column 28.

As the pull-down carriage assembly 110 moves downward, the lowermost pail 30 is stripped or separated from the column 28 and lowered by the pull-down carriage assembly 110 until the bottom wall 18 of the separated pail 30 rests on top of the pail slides 146. Sensors 180 again signal the logic control circuit to interrupt the power cylinder 137 to stop movement of the pull-down carriage assembly 110. The power cylinder 168 attached to the pail ejector assembly 152 is then actuated, thereby raising the lower ends of the pail push-out bars 162 and causing the pail ejector bar 154 to travel forward along the track 156 and press against the rear side wall 40 of the separated pail 30, pushing the separated pail 30 in a generally linear horizontal path along the pail slides 146 toward the front ends 148 thereof and continuing out of the open front of the housing 12.

During generally the same time interval that the pail ejector assembly 152 is ejecting the separated pail 30 from the pail delivery station, the power cylinder 86 may be activated to move the sliding pail support carriage 62 reciprocally backward and forward to lower the column 28 of pails 30 a distance generally equal to the normal vertical spacing between the top rims 36 of adjacent pails 30 when those pails 30 are nested.

The pail ejector assembly 152 is retracted and the pail pull-down carriage 110 is raised to complete the operating cycle, the pail separating mechanism 10 thereby returning to its initial position such that the now lowermost pail 30 may be separated from the column 28.

While the preferred embodiment of the above pail separator mechanism 10 has been described in detail above with reference to the attached drawing Figures, it is understood that various changes and adaptations may be made in the pail separator mechanism 10 without departing from the spirit and scope of the appended claims.

What is claimed is:

1. A mechanism for separating a lowermost container from a nested column of like containers, each said container having a generally upright side wall defining a receptacle region and a rim extending outwardly from said side wall, said mechanism comprising:

a housing having a generally open top and a container delivery station;

stacking means for retaining the column of like containers in a generally vertical nested stack at an elevation above the container delivery station with the lowermost container disposed proximate to the open top of the housing;

column support means engaging the column of like containers and including means for controllably lowering the elevation of the column of like containers an incremental amount generally equal to a normal vertical spacing between the rims of adjacent like containers;

a container pull-down carriage assembly mounted for generally vertical linear movement between a raised position proximate to the elevation of the lowermost container and a lowered position;

container separating means for separating the lowermost container from the column of like containers, the container separating means being mounted on the container pull-down carriage assembly for movement therewith and including at least one toggle mounted for movement such that the toggle will engage the rim of the lowermost container when the container pull-down carriage assembly is moved to the raised position and such that the toggle will exert a force on the lowermost container to separate the lowermost container from the column as the container pull-down carriage assembly is moved to the lowered position, the container pull-down carriage assembly delivering the separated container to the container delivery station as the container pull-down carriage assembly moves to the lowered position; and a container ejector assembly to eject the separated container from the container delivery station.

2. The container separating mechanism of claim 1 wherein the column of like containers includes a second to lowermost container disposed above and adjacent to the lowermost container, and wherein each toggle exerts a force inwardly on the side wall of the second to lowermost container as the pull-down carriage assembly moves to the lowered position.

3. The container separating mechanism of claim 1 wherein the number of toggles is two, each toggle being disposed on an opposing side of the lowermost container of the column when the container pull-down carriage assembly is moved to the raised position.

4. The container separating mechanism of claim 1 wherein each toggle is mounted on a toggle mounting block to move pivotally about an axis.

5. The container separating mechanism of claim 4 wherein each toggle has a tip portion and a surface confronting the rim of the lowermost container when the toggle is disposed beneath the rim of the lowermost container, the surface contacting the rim of the lowermost container as the container pull-down carriage assembly is moved upwardly to the raised position such that the tip portion of the toggle moves outwardly away from the side wall of the container allowing the top portion to pass the rim, and wherein the tip portion of the toggle moves inwardly toward the side wall and engages above the rim when the top portion of the toggle moves above the rim.

6. The container separating mechanism of claim 5 wherein the toggle is mounted for pivotal movement about an axis, and wherein the tip portion of the toggle is moved inwardly toward the side wall of the lowermost pail by a spring.

7. The container separating mechanism of claim 5 wherein the surface of the toggle is angled at an acute angle relative to the side wall of the lowermost pail.

8. The container separating mechanism of claim 1 wherein the container pull-down carriage assembly further comprises:

separated container support means disposed beneath the toggle, the separated container support means supporting and controllably lowering the separated container to the container delivery station.

9. The container separating mechanism of claim 1 wherein the container delivery station includes at least one generally horizontal plane on which the separated container may rest and slide along a generally linear path, and an open front of the housing communicating with the plane, and wherein the container ejector assembly comprises:

a container ejector bar, said container ejector bar being mounted for movement in a generally linear path substantially parallel with the generally linear path of the separated container being ejected from the mechanism, the container ejector bar having a length extending laterally within the housing;

ejector bar carrier means for moving the container ejector bar reciprocally backward to a retracted position disposed behind the position at which the separated container rests in the pair delivery station and forward into contact with the separated container resting on the plane and to an extended position a distance sufficient to eject the separated container from the open front of the housing; and at least one push-out bar, said push-out bar having a top end and a bottom end, said top end and said bottom end of said push-out bar being movably mounted relative to said housing, neither said top end nor said bottom end of said push-out bar being connected to a stationary pivotal axis relative to the housing.

10. The container separating mechanism of claim 9 wherein the pail ejector bar is mounted to slide within a pair of tracks disposed on opposing sides of the housing, the tracks each being defined by a pair of spaced apart ejector bar guides having facing surfaces.

11. The container separating mechanism of claim 9 wherein the number of the push-out bars is two, the ejector bar carrier means further comprising:

at least one dual acting power cylinder having opposing ends and capable of expansion and contraction, the bottom end of each of the two push-out bars being connected to one of the ends of the power cylinder, the opposing end of the power cylinder being connected to the housing, whereby the power cylinder may responsively move the bottom ends of each of the two push-out bars, thereby moving the top ends of each of the two push-out bars and carrying the ends of the pail ejector bar in the generally linear path.

12. The container separating mechanism of claim 1 wherein the container delivery station comprises:

a pair of generally parallel spaced apart container slides, said container slides being mounted in a generally horizontal position disposed beneath the container pull-down carriage and extending forwardly therefrom.

13. The container separating mechanism of claim 12 wherein each container slide has a top surface, the top surfaces of the container slides defining the plane on which the separated container rests and slides.

14. The container separating mechanism of claim 12 wherein the container slides each have a height relative to the housing and the container pull-down carriage, the height of the container slides being adjustable relative to the housing and the container pull-down carriage.

15. A mechanism for separating a lowermost container from a column of like containers, wherein the column of like containers includes a second to lowermost container disposed above and adjacent to the lowermost container, said second to lowermost container having a side wall, said lowermost container defining a rim, said mechanism comprising:

a housing having a container delivery station;

stacking means for retaining the column of like containers at an elevation with the lowermost container disposed above the container delivery station;

a container pull-down carriage assembly mounted for generally vertical movement between a raised position proximate to the elevation of the lowermost container and a lowered position;

container separating means for separating the lowermost container from the column of like containers, the container separating means being mounted on the container pull-down carriage assembly for movement therewith and including at least one toggle mounted for movement such that said toggle will engage the rim of the lowermost container when the container pull-down carriage assembly is moved to the raised position and such that said toggle will exert a force on the lowermost container to separate the lowermost container from the column of like containers as the container pull-down carriage assembly is moved to the lowered position, said toggle contacting and exerting a force inwardly on the side wall of the second to lowermost container as the pull-down carriage assembly moves to the lowered position, the container pull-down carriage assembly delivering the lowermost container to the delivery station as the container pull-down carriage assembly is moved to the lowered position; and a container ejector assembly to eject the lowermost container from the container delivery station.

16. The container separating mechanism of claim 15 wherein said toggle engages above the rim of the lowermost container and exerts a downward pressure on the rim of the lowermost container as the container pull-down carriage assembly is moved to the lowered position.

17. The container separating mechanism of claim 15 wherein the number of toggles is two, each toggle being spaced apart on opposing sides of the lowermost container.

18. The container separating mechanism of claim 15 further comprising:

column support means engaging the column of like containers and including means for controllably lowering the elevation of the column of like containers an incremental amount generally equal to a normal vertical spacing between the rims of adjacent like containers.

* * * * *